United States Patent [19]

Choby, Jr.

[11] 3,985,586

[45] Oct. 12, 1976

[54] PHOSPHORIC ACID SOLDERING FLUX

[75] Inventor: Edward G. Choby, Jr., Pittsburgh, Pa.

[73] Assignee: Allegheny Ludlum Industries, Inc., Pittsburgh, Pa.

[22] Filed: Dec. 23, 1974

[21] Appl. No.: 535,744

[52] U.S. Cl. .................................. 148/23; 148/24
[51] Int. Cl.² ..................................... B23K 35/24
[58] Field of Search ............................. 148/22–26

[56] References Cited
UNITED STATES PATENTS

| | | | |
|---|---|---|---|
| 2,987,817 | 6/1961 | Kozlik | 148/26 |
| 3,486,948 | 12/1969 | Laubmeyer | 148/24 |
| 3,589,952 | 6/1971 | Burne | 148/24 |
| 3,597,285 | 8/1971 | Aronberg | 148/26 |
| 3,660,127 | 5/1972 | Aronberg | 148/26 |
| 3,814,638 | 6/1974 | Jordan | 148/23 |
| 3,865,641 | 2/1975 | Aronberg | 148/26 |

*Primary Examiner*—Peter D. Rosenberg
*Attorney, Agent, or Firm*—Vincent G. Gioia; Robert F. Dropkin

[57] ABSTRACT

A phosphoric acid flux with good fluxing efficiency and high viscosity, and one which is especially suitable for use in the soldering of copper and copper-plated stainless steel. The flux is in the form of a viscous fluid, or a thermally unstable emulsion when the fluid is combined with a pasty vehicle. The viscous fluid contains phosphoric acid and an organic material (molecular weight between 4,000 and 20,000) from the group consisting of polyethers and polyimines or mixtures thereof having an atomic ratio of carbon to ether oxygen plus imine nitrogen between 1.5 and 3.1.

12 Claims, No Drawings

PHOSPHORIC ACID SOLDERING FLUX

The present invention relates to a soldering flux and, more particularly, to a soldering flux especially suitable for use in the soldering of copper and copper-plated stainless steel.

Although phosphoric acid is an excellent soldering flux for copper and copper-plated stainless steel, it has not been generally accepted by the plumbing trade because of its low viscosity. Attempts to overcome the viscosity problem by blending petrolatum and other pasty vehicles with the phosphoric acid failed to produce a suitable flux. The pasty vehicles improved texture but reduced the fluxing efficiency of the flux. A further attempt to produce a suitable flux by blending less petrolatum and more phosphoric acid also proved ineffectual. The resulting flux was an unstable emulsion, one in which the acid separated from the petrolatum.

The present invention overcomes the heretofore referred to shortcoming of phosphoric acid fluxes by providing one with good fluxing efficiency and high viscosity. To phosphoric acid is added an agent which is soluble or miscible therewith, and one which increases its viscosity at both room and soldering temperatures. The agent is an organic material (molecular weight between 4,000 and 20,000) from the group consisting of polyethers and polyimines or mixtures thereof having an atomic ratio of carbon to ether oxygen plus imine nitrogen between 1.5 and 3.1.

It is accordingly an object of the present invention to provide a phosphoric acid flux having good fluxing efficiency and high viscosity.

The flux of this invention can take the form of a viscous fluid or a thermally unstable emulsion. The emulsion results when the viscous fluid is combined with a pasty vehicle to form a mixture having from 30 to 70%, by weight, of pasty vehicle. In weight percent, the viscous fluid consists essentially of 35 to 85% phosphoric acid (based on a concentration of 75 to 95%), 15 to 65% of organic material from the group consisting of polyethers and polyimines or mixtures thereof having an atomic ratio of carbon to ether oxygen plus imine nitrogen between 1.5 and 3.1, and from 0 to 30% water. The molecular weight of the organic material is between 4,000 and 20,000. For purposes of definition, ether or imine functionalities which are present as branches to the main polymer chain (as the methoxyl groups in a methylated glucoside) are counted. All of the carbon atoms in the molecule are counted, but oxygen or nitrogen which is not present as ether or imine linkages is not counted.

Phosphoric acid is present in the viscous fluid in an amount of from 35 to 85% and preferably 40 to 80%, based upon the use of 75 to 95% phosphoric acid. If the concentration is too low, the resulting mixture will be either a solid or a gum, and hence not conducive for application to the surface to be soldered. Too high a concentration of phosphoric acid results in a mixture which is too fluid to remain in the joint at soldering temperature.

The molecular weight of the organic material is between 4,000 and 20,000, and preferably between 6,000 and 10,000. Organic materials with too low a molecular weight are not capable of providing the fluid with sufficient viscosity. On the other hand, organic materials with too high a molecular weight will yield a flux with too high a viscosity to adequately flow. Typical organic materials which satisfy the criteria of the present invention are polyethylene glycol, polypropylene glycol, methyl cellulose and polyethyleneimine. Depending upon the molecular weight of the organic material various amounts of water can be added to the flux. For higher molecular weight organic materials, we have reason to believe that up to 30% water can be added. Water levels will, however, generally be below 20%. The preferred level of organic material is from 20 to 60%.

A pasty vehicle can be added to the viscous fluid to turn it into a thermally unstable emulsion. Users of the flux usually find the texture of the emulsion more desirable to work with. At soldering temperatures, the emulsion breaks and separates into components. Typical pasty vehicles are petrolatum, animal fats and hydrogenated vegetable and nut oils. As a general rule the mixture should have at least 30%, by weight, of a pasty vehicle. Levels in excess of 70% can result in too stable an emulsion and poor wetting of the surface to be soldered. A preferred range is from 33 to 40%. The emulsified flux of this invention can accomodate greater percentages of phosphoric acid than could previously known phosphoric acid pasty vehicle fluxes, as the organic material described hereinabove is included therein.

The present invention also envisions additions of wetting agents, dyes, and oxidizing agents such as ammonium nitrate. Such additions are not, however, necessary for the attainment of the desired properties. A copper-bearing version of the flux described herein is disclosed in Application Ser. No. 535,765. Application Ser. No. 535,765 was filed on Dec. 23, 1974.

The following examples are illustrative of several aspects of the invention. As stated hereinabove the soldering flux described herein is especially suitable for use in the soldering of copper and copper-plated stainless steel.

EXAMPLE I

The following were mixed together in order to form a flux:

37.5gm Polyethylene glycol (MW-6000)
25.0gm Phosphoric acid (85%)
37.5gm Petrolatum The mixture contained 62.5% viscous fluid and 37.5% pasty vehicle. It was heated to 150° F to melt the polyethylene glycol and the petrolatum and stirred vigorously while it cooled to 120° F. From 120° F it was allowed to cool without stirring.

Sections of ¾ inch diameter T437 stainless steel tubing bearing a copper plating on the exterior surface were joined using copper sleeve fittings and 50 Pb/50 Sn solder. The assembled joints were held in a jig in a fixed reproducible relationship to an air-acetylene flame. The joints were fluxed and heated for a measured time; then the flame was removed and solder was fed thereto. One of the joints was prepared using the abovedescribed flux. It was heated for 30 seconds and a water-tight joint was produced. Under the same conditions, a flux prepared from 25% phosphoric acid (85%) and 75% petrolatum failed when the heating time exceeded 17 seconds. Note the advantage of replacing some of the petrolatum with polyethylene glycol. The flux with polyethylene glycol was stored for two months without any separation of the emulsion occurring.

EXAMPLE II

The following were mixed together in order to form a flux:

58.8 gm Phosphoric acid (75%)
41.2 gm Polyethylene glycol (MW-6000)

The mixture was heated to 175° F to melt the polyethylene glycol. Once the polyethylene glycol was melted, the mixture was stirred to make it homogeneous and allowed to cool. Joints prepared in the manner of the previous example, but with the liquid flux of this example, were found to be water-tight even when the heating time was 55 seconds.

It will be apparent to those skilled in the art that the novel principles of the invention disclosed herein in connection with specific examples thereof will suggest various other modifications and applications of the same. It is accordingly desired that in construing the breadth of the appended claims they shall not be limited to the specific examples of the invention described herein.

I claim:

1. A viscous fluid suitable for use as a soldering flux; said fluid consisting essentially of, in weight precent, 35 to 85% phosphoric acid (based on a concentration of 75 to 95%), 15 to 65% of organic material selected from the group consisting of polyethers and polyimines and mixtures thereof having an atomic ratio of carbon to ether oxygen plus imine nitrogen between 1.5 and 3.1, and from 0 to 30% water, said organic material having a molecular weight between 4,000 and 20,000.

2. A viscous fluid according to claim 1, having 40 to 80% phosphoric acid, 20 to 60% organic material and 0 to 20% water.

3. A viscous fluid according to claim 1, wherein said organic material has a molecular weight between 6,000 and 10,000.

4. A viscous fluid according to claim 1, wherein said organic material is from the group consisting of polyethylene glycol, polypropylene glycol, methyl cellulose and polyethyleneimine.

5. A viscous material according to claim 4, wherein said organic material is polyethylene glycol.

6. A soldering flux consisting essentially of a viscous fluid and from 30 to 70%, by weight, of pasty vehicle; said viscous fluid consisting essentially of, in weight percent, 35 to 85% phosphoric acid (based on a concentration of 75 to 95%), 15 to 65% of organic material selected from the group consisting of polyethers and polyimines and mixtures thereof having an atomic ratio of carbon to ether oxygen plus imine nitrogen between 1.5 and 3.1, and from 0 to 30% water; said organic material having a molecular weight between 4,000 and 20,000.

7. A soldering flux according to claim 6, wherein said viscous fluid has 40 to 80% phosphoric acid, 20 to 60% organic material and 0 to 20% water.

8. A soldering flux according to claim 6, wherein said organic material has a molecular weight between 6,000 and 10,000.

9. A soldering flux according to claim 6, wherein said organic material is from the group consisting of polyethylene glycol, polypropylene glycol, methyl cellulose and polyethyleneimine.

10. A soldering flux according to claim 9, wherein said organic material is polyethylene glycol.

11. A soldering flux according to claim 6, wherein said pasty vehicle is petrolatum.

12. A soldering flux according to claim 6, having from 33 to 40% of pasty vehicle.

* * * * *